(12) United States Patent
Lutz

(10) Patent No.: US 6,695,113 B2
(45) Date of Patent: Feb. 24, 2004

(54) VISCOUS COUPLING

(75) Inventor: Manfred Lutz, Schweinfurt (DE)

(73) Assignee: Horton Sachs GmbH & Co., KG, Schweinfurt (DE)

( * ) Notice: Subject to any disclaimer, the term of this patent is extended or adjusted under 35 U.S.C. 154(b) by 0 days.

(21) Appl. No.: 10/144,514

(22) Filed: May 13, 2002

(65) Prior Publication Data

US 2002/0166747 A1 Nov. 14, 2002

(30) Foreign Application Priority Data

May 11, 2001 (DE) .......................... 101 22 795

(51) Int. Cl.[7] .............................................. F16D 35/02
(52) U.S. Cl. .................. 192/58.61; 192/58.8
(58) Field of Search .................. 192/58.61, 58.8, 192/82 T

(56) References Cited

U.S. PATENT DOCUMENTS

| 4,302,156 A | 11/1981 | LaFlame ................. 416/169 A |
| 5,030,865 A | 7/1991 | Rockey et al. .................. 310/78 |
| 5,152,383 A | 10/1992 | Boyer et al. ................ 192/58 B |
| 5,152,384 A | 10/1992 | Brown ...................... 192/58 B |
| 5,584,371 A | 12/1996 | Kelledes et al. ........... 192/58.61 |
| 5,893,442 A * | 4/1999 | Light ....................... 192/58.61 |
| 5,992,594 A * | 11/1999 | Herrle et al. ............. 192/58.61 |
| 6,056,098 A * | 5/2000 | Brown et al. ............. 192/58.61 |
| 6,419,064 B1 * | 7/2002 | Krammer .................. 192/58.61 |
| 6,530,462 B2 * | 3/2003 | Lutz ........................ 192/58.61 |

FOREIGN PATENT DOCUMENTS

| DE | 4037265 A1 * | 5/1992 | ............ F16D/35/00 |
| DE | 199 25 132 | 12/2000 | ............ F16D/35/02 |
| EP | 0 550 413 | 7/1993 | ............ F16D/35/02 |
| JP | 4-258530 A * | 9/1992 | ............ F16D/35/02 |

* cited by examiner

*Primary Examiner*—Richard M. Lorence
(74) *Attorney, Agent, or Firm*—Cohen, Pontani, Lieberman & Pavane

(57) ABSTRACT

A valve arrangement arranged in a flow connection between a storage chamber and an operating chamber is actuated by means of an electromagnetic actuating device and, depending on an input rotational movement to a closure element, controls a fluid flow from the storage chamber into the operating chamber. Rotational movement is provided by a rotary armature arranged immediately next to an electromagnet and fixed to a common shaft with the closure element. The magnetic flux path of the electromagnetic actuating device is shortened and thus the efficiency of the arrangement is increased significantly.

32 Claims, 6 Drawing Sheets

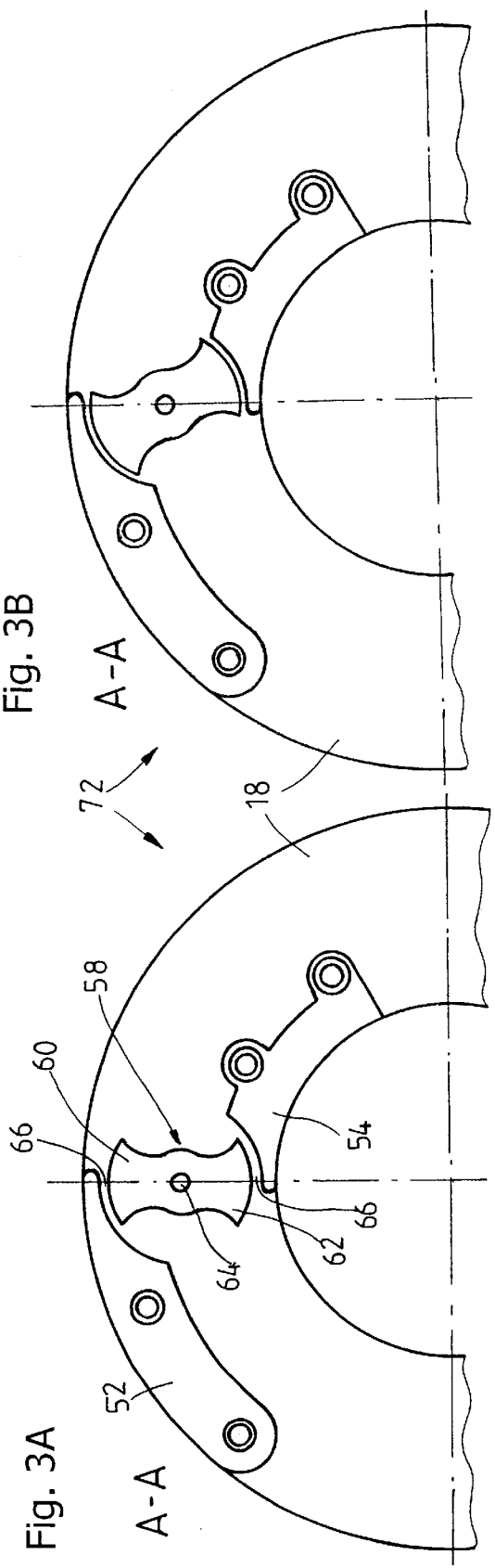
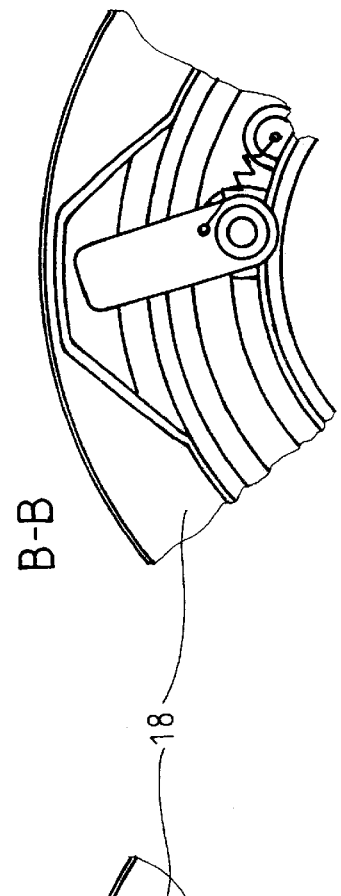
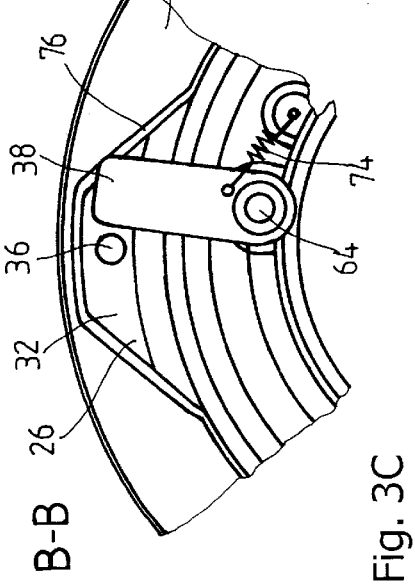
Fig. 3A  Fig. 3B  Fig. 3C  Fig. 3D

VISCOUS COUPLING

BACKGROUND OF THE INVENTION

1. Field of the Invention

The invention relates to a viscous coupling of the type having a coupling housing fixed to a drive shaft, an operating chamber and a storage chamber arranged in the housing and having a fluid connection, and a valve arrangement which controls fluid flow in the connection as a function of an input rotary movement of an electromagnetic actuating device. Viscous couplings of this type are known, for example, from the field of motor vehicle technology and are used to control the rotational speed of a cooling fan connected to an internal combustion engine of a vehicle on the basis of an operating parameter, for example the cooling water temperature of an associated radiator.

2. Description of the Related Art

U.S. Pat. No. 5,152,383 discloses a viscous fluid coupling having an electromagnetic actuating device, an annular coil rotationally fixedly arranged on the side of the viscous coupling facing away from the internal combustion engine and coaxially with the drive shaft of the viscous coupling, and a rotary armature made of a ferromagnetic material in the storage chamber, which armature is rotatably arranged on a shaft and is connected to a valve disk. The rotary armature is surrounded radially on the outside by a flux guide ring. Both the rotary armature and the flux guide ring have a plurality of poles in the circumferential direction which, in an initial position, are offset from another in the circumferential direction. The flux guide ring is arranged in a housing of the viscous coupling, which can be rotated with respect to the annular coil, and extends in the axial direction as far as the immediate vicinity of a ferromagnetic housing surrounding the annular coil. If, as predefined by a controller, the annular coil is energized with a current flow, then a magnetic flux path is formed incorporating the housing of the annular coil, the flux guide ring, the rotary armature and the shaft of the latter and a rotary bearing arranged in this area, the flux path attempting to minimize its magnetic resistance. As a result, the rotary armature executes a pivoting movement from its initial position and assumes a position in which the poles are radially opposite one another in pairs. The valve disk firmly arranged upon the rotary armature can in the process, as predefined, either open or close a valve opening arranged in the fluidic connection between the operating chamber and the storage chamber. After the conclusion of the energization of the annular coil with current, the rotary armature is pivoted back into its initial position again by means of a restoring element. In the case of this configuration, there is the disadvantage that the magnetic flux path is guided over a relatively long distance, and, as a result, relatively high magnetic losses and a relatively low efficiency of the arrangement are achieved. Furthermore, the arrangement of the electromagnet on the side of the viscous coupling facing away from the internal combustion engine takes up axial space, which is generally very short in the engine compartments of modern vehicles and is generally not available.

U.S. Pat. No. 6,433,283 teaches a viscous coupling which likewise has an electromagnetic actuating device for controlling a valve opening arranged in a fluidic connection between the storage chamber and the operating chamber. Arranged on the side of the viscous coupling facing the internal combustion engine is an annular coil, which encloses a drive shaft consisting of magnetically conductive material and belonging to the viscous coupling. Arranged within the storage chamber is an armature plate made of a likewise magnetically conductive material, which is connected to a valve plate that is pivotably mounted by means of a hinge. The hub of the coupling housing, facing the annular coil, is provided with an inserted first guide ring made of magnetic material, which has one end in contact with the annular coil and, at its other end facing the operating chamber, adjoins with a gap a second guide ring of magnetic material, which passes through the rotor of the viscous coupling and ends in an area in front of the armature of the valve plate. If the annular coil is energized with a current, then a magnetic flux is formed incorporating the two guide rings, the armature plate and the drive shaft, as a result of which the valve plate executes a substantially axial movement and opens the valve opening arranged between the storage chamber and the operating chamber. In this variant, too, the magnetic circuit is very complicated in constructional terms and is configured such that it extends over a great deal of space.

SUMMARY OF THE INVENTION

The object of the invention is to provide a viscous coupling in which the magnetic losses of an electromagnetic actuating device formed within the viscous coupling are reduced and its efficiency is increased considerably with a compact design.

According to the invention, the electromagnetic actuating device includes an electromagnet and a rotary armature arranged immediately next to the electromagnet to form a magnetic flow path including the armature when the magnet is excited. The rotary armature and a closure element of the valve arrangement are fixed on a common shaft which is rotatably mounted in the housing.

By arranging the rotary armature on a shaft immediately adjacent to the electromagnet, the magnetic flux path is shortened considerably, by the actuating element being positioned closer to the magnetic field source of the electromagnetic actuating device. A likewise simple and effective forwarding of a movement of the rotary armature to the valve arrangement is achieved by the operative connection to the valve arrangement being produced by a shaft rotationally fixedly connected to the rotary armature. The magnetic flux guiding means can thus remain outside the storage or operating chamber.

In an advantageous development, the invention provides for the shaft and therefore the rotary armature to be formed radially on the coupling housing in the area of the storage chamber. In conjunction with a compact configuration of the armature, the electromagnetic actuating arrangement can overall be designed in a space-saving manner, with a very shortened magnetic flux path.

In a further improvement, the invention provides for the electromagnet to be substantially horseshoe-shaped and for its poles to be arranged spaced apart radially in relation to the drive shaft. In this way, the magnetic field source can be configured extremely compactly and efficiently.

Alternatively, with regard to the variant mentioned previously, it proves to be beneficial to form the electromagnet in the form of an annular coil. An annular coil of this type comprises a plurality of circularly executed turns of an electric conductor, which may be produced very cost-effectively.

In an advantageous development of the invention, provision is made to form a magnetically conductive housing on the electromagnet. When the electromagnet is energized, as a result, the magnetic field lines surrounding the electric conductors concentrically are focused and these can run on a predetermined path.

It proves to be beneficial to form magnetic flux guiding means on the coupling housing, this means assuming substantially the same axial position in relation to the rotary armature. As a result of this configuration, an axially shorter, that is to say more space-saving, physical extent of the electromagnetic actuating device is implemented.

If the electromagnet is energized, at least one magnetic pole is preferably formed on the housing of the electromagnet, on the side facing the coupling housing. The magnetic field originating from this pole can easily be coupled into the rotary armature or the bottom guiding means associated with the coupling housing, in order to form a closed magnetic circuit.

Furthermore, the rotary armature, the shaft and the closure element form a rotary lever device, which has a restoring element. This ensures that the electromagnetic actuating device assumes a predetermined position when not energized, and the viscous coupling changes into a predetermined operating state.

At least one stop element is advantageously provided, which limits a pivoting movement of the rotary lever device. This configuration also effects the assumption of predefined positional states of the closure element.

With regard to the embodiment mentioned previously, it is very advantageous if the electromagnetic actuating device can open the valve opening when the electromagnet is not energized, and close this opening when the electromagnet is energized. In the event of failure of a control electronics unit provided for the electromagnet or of the electromagnet itself, the viscous coupling automatically changes into an operationally safe state, the fluid contained in the viscous coupling flowing in a continuous circuit from the storage chamber through the valve opening into the operating chamber and from there, by means of a pumping element, back again into the storage chamber, and the coupling housing being driven via the fluid such that it is carried along rotationally with respect to the rotor of the viscous coupling.

In a further advantageous embodiment, the rotary armature comprises a permanent magnet. The rotary lever device created by this means automatically assumes a defined initial position, whereby the embodiment of a restoring element can be dispensed with.

It is further advantageous to arrange the electromagnet on the side of the viscous coupling facing the drive shaft. In this case, the electromagnet can, for example, be secured against rotation on an engine housing. In the case of a mounting on the engine side, the electric feed lines of the electromagnet can advantageously also be laid.

In a further variant, associated with a special advantage, the annular coil encloses a drive shaft of the viscous coupling. The electromagnet can thereby be arranged in a space-saving manner on the side facing an internal combustion engine.

In order to operate a viscous coupling, a method is advantageously used in which the intensity of the torque transmission coupling between the rotor and the housing and the rotor is set by means of pulsed energization of the electromagnet. Therefore, an actuating movement of the closure element, opening and closing the valve opening, can be controlled in such a way that, as a time average, a fluid flow is established which corresponds to any desired intermediate state of the fully opened or fully closed valve opening.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3A is an axial view, taken along line A—A in FIG. 1, showing the rotary armature in the non-actuated state;

FIG. 3B is an axial view, taken along line A—A in FIG. 1, showing the rotary armature in the actuated state;

FIG. 3C is an axial view, taken along line B—B in FIG. 1, showing the valve in the open position;

FIG. 3D is an axial view, taken along line B—B in FIG. 1, showing the valve in the closed position;

DETAILED DESCRIPTION OF THE PRESENTLY PREFERRED EMBODIMENTS

Figure 1:
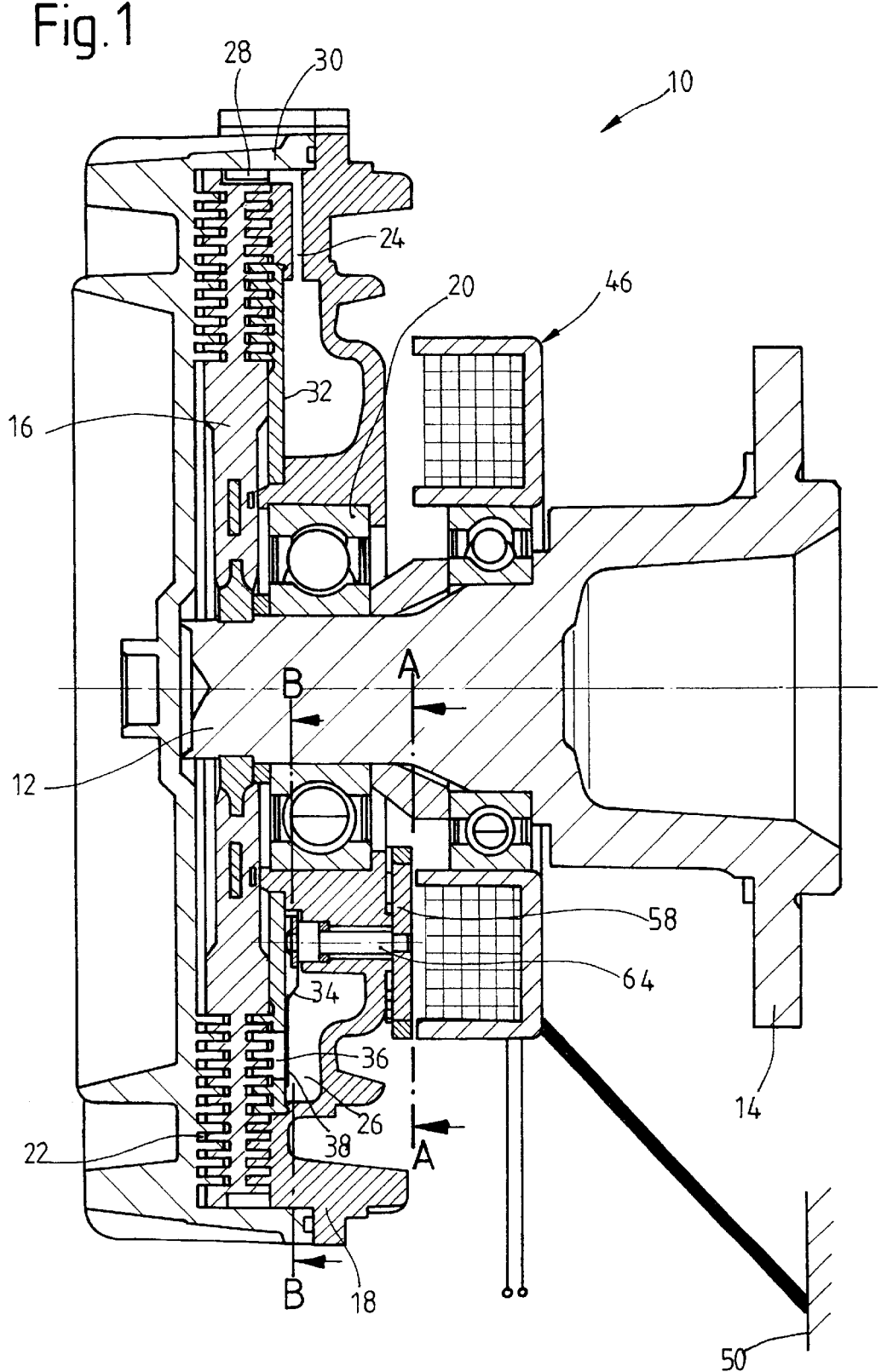
FIG. 1 Shows a longitudinal sectional view of one embodiment of the viscous coupling according to the invention.

FIG. 1 shows a viscous coupling 10, which comprises a rotor 16 that is rotationally fixedly connected to a drive shaft 12 via a drive flange 14 and is arranged in a nonmagnetic coupling housing 18, for example consisting of an aluminum material. For instance, if the viscous coupling 10 according to the invention is used to drive or couple a fan, the coupling housing 18 can carry a cooling fan or the like. With respect to the rotor 16, the drive shaft 12 and the drive flange 14, the coupling housing 18 is mounted via a bearing arrangement 20 such that it can rotate freely.

In the radially outer area, the coupling housing 18 forms an operating chamber 22, in which the coupling housing 18 and the rotor 16 interengage alternately with their respective rib-like surfaces in order to increase the total surface. Also provided in the coupling housing 18 is a connecting line 24, via which fluid can be led from the operating chamber 22 into a storage chamber 26.

Provided radially on the outside on the coupling housing 18, in the area of the operating chamber 22 and of the connecting line 24, is a static pressure element 28 of a pump arrangement 30 constructed as a static pressure pump which, during a relative movement between rotor 16 and coupling housing 18, conveys the fluid which is present in the area of the operating chamber 22 and which is drawn radially outward by the action of centrifugal force, into an opening in the coupling housing 18, from where the fluid can flow into the storage chamber 26 via the connecting line 24. The storage chamber 26 and the radially inner area of the operating chamber 22 are separated from each other by a dividing wall 32. Furthermore, in the flow path between the storage chamber 26 and the operating chamber 22 there is provided a valve arrangement 34 and by means of which the fluid connection between the storage chamber 26 and the operating chamber 22 can be produced or interrupted as desired. For this purpose, an opening 36 is formed in the dividing wall 32, and can be closed by a prestressed closure element 38. For example, the closure element 38 can be formed by a valve plate 38 which can be pivoted, which rests axially on one side on the dividing wall 32 and is prestressed in the open position by a spring.

In the following text, the construction and the function of an electromagnetic actuating device 40 according to the invention for actuating the valve plate 38 will be described by using FIG. 2.

The actuating device 40 comprises, firstly, an electromagnet 42, which is formed by an annular coil 42 with electric connections 44, which is enclosed in a magnetically conductive housing 46. The housing 46 has a U-shaped cross section, whose open side faces the coupling housing 18. Radially on the inside, the annular coil 42 is mounted via a bearing 48 on the drive flange 14. In addition, the housing 46 is rotationally fixedly arranged by a stationary or fixable component 50, for example a vehicle frame or an engine block 50 or the like.

If the annular core 42 is energized, the housing 46 serves the purpose of focusing the magnetic field lines surrounding the annular coil 42 and guiding these field lines into its interior, magnetic poles being impressed on the open ends of the housing 46. The housing 46 therefore constitutes magnetic flux guiding means.

Axially opposite to the electromagnet 42 and at substantially the same radial position in relation to the latter, a pair of two pole shoes 52, 54 of magnetically conductive material is arranged on the coupling housing 18 and operatively connected via an axial air gap 56 to the electromagnet 42. In FIGS. 3A and 3B, the pole shoes 52, 54 are designed in the form of circular ring segments and, by means of fastening means, for example a screw or a riveted connection, partially overlapping in the circumferential direction but offset radially with respect to one another, are fixed to the coupling housing 18. The radially opposite sections of the pole shoes 52, 54 each have a recess shaped approximately like a circular segment, between which there is arranged a rotary armature 58, whose poles 60, 62 have a shape corresponding thereto. The rotary armature 58 is rotationally fixedly mounted centrally on a shaft 64 and can be pivoted with the latter. Formed radially between the rotary armature 58 and the pole shoes 52, 54 are air gaps 66. The shaft 64 is arranged in a hole 68 extending axially in the coupling housing 18 and has sealing means 70 which prevent the unintentional emergence of fluid from the storage chamber 26. The shaft 64 projects into the storage chamber 26 and, at its one end, bears the valve plate 38 in a rotationally fixed manner, the valve plate 38 consisting of a sheet-metal strip, for example. As a result of its shape, the latter bears on the dividing wall 32, axially prestressed in an intended manner, and in the state illustrated in FIG. 3C opens the opening 36 completely. A rotary lever movement 72 is formed by the rotary armature 58, the shaft 64 and the valve plate 38. In addition, a spring acting as a restoring element 74 is arranged in an operative connection between the coupling housing 18 and the valve plate 38 and, when the electromagnetic actuating device 40 is not energized, is substantially unstressed and therefore the valve plate 38 opens the opening 36. One wall 76 of the storage chamber 26 formed in the coupling housing 18 serves at the same time as a stop 76, on which the valve plate 38 comes to bear in this state. The rotary armature 58 can execute a pivoting movement, at least over a limited angular range, for example about 20° to 30°, before the movement is limited by the stop 76. For example, an appropriately designed pole shoe can also function as a stop, or else a further element fixed to the housing but not illustrated. As can be seen from FIG. 2, the pole shoe 52 arranged radially on the outside is associated with a radially outer section 78 of the U-shaped housing 46, and the pole shoe 54 arranged radially on the inside is associated with a radially inner section 80 of the housing 46. The mutually associated components in this way form operative magnetic pairs. For a magnetic interaction, which is desired with respect to the relative position of the coupling housing 18 to the rotationally fixedly arranged electromagnet 42, it is necessary that, during a rotational movement of the coupling housing 18, the pole shoes 52, 54 and the housing sections 78, 80 are within the magnetic active range of the respectively associated element. Following this idea, in principle numerous configuration variants are conceivable. In FIG. 1, the electromagnet 42 is annular, incorporating the drive shaft 12, and the pole shoes 52, 54 cover only a circular segment which, during a rotational movement of the coupling housing 18, passes through a circular path corresponding to the shape of the electromagnet 42.

Figure 4:
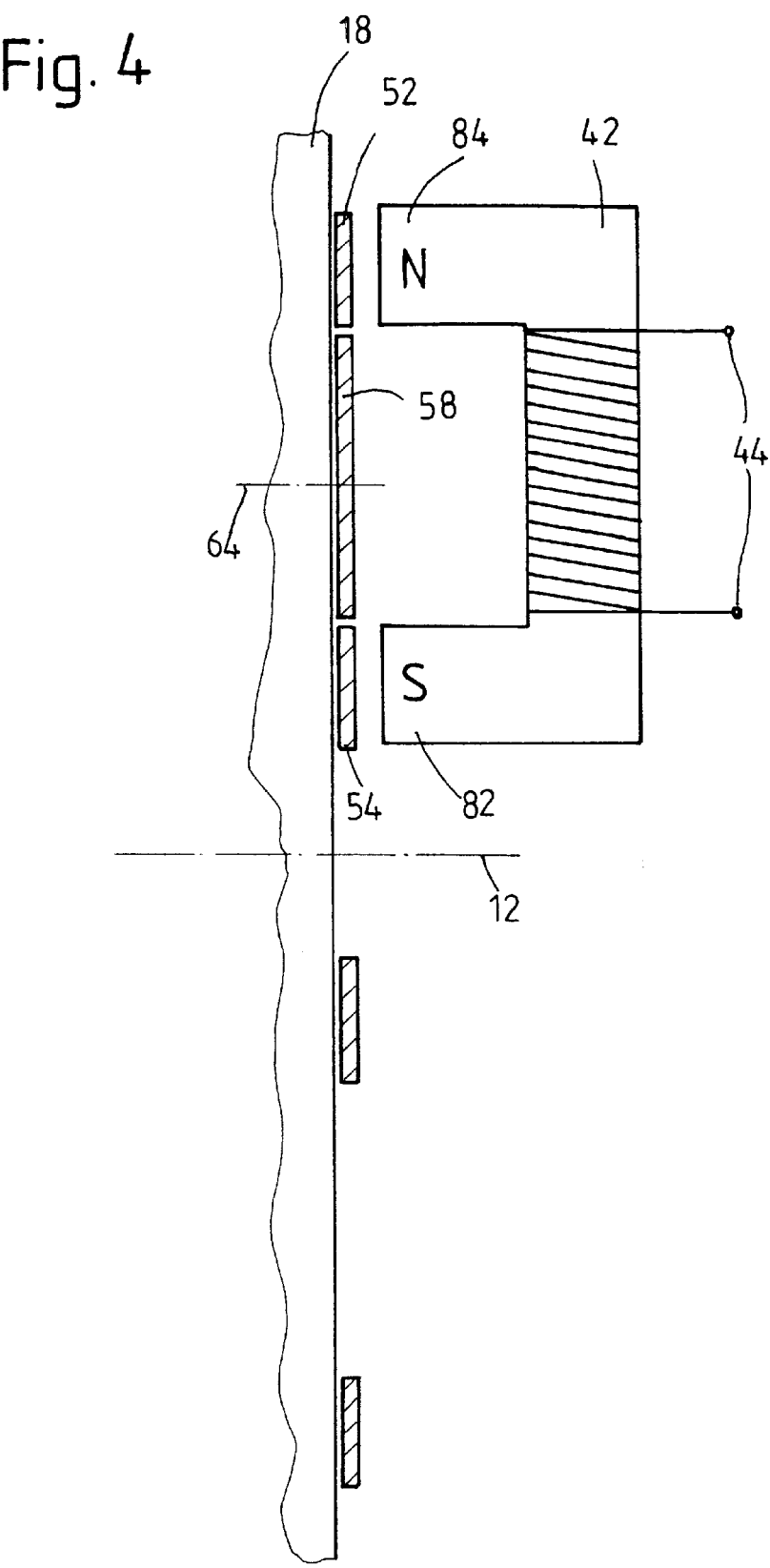
FIG. 4 shows a longitudinal section of an alternative arrangement of an electromagnetic actuating device.

As an alternative, an arrangement inverse to the arrangement explained is illustrated schematically in FIG. 4, only one circular segment being covered by an electromagnet 42 and the pole shoes 52, 54 being of circular ring shape, at least in some sections. For example, the electromagnet 42 can have a horseshoe shape, its magnetic poles 82, 84 being arranged radially with respect to the coupling housing 18.

The common factor in the arrangements illustrated is that the mutual radial spacing of the pole shoes 52, 54 and the mutual radial spacing of the open housing ends 78, 80 is greater than the spacing, formed by the axial air gap 56, between a pole shoe 52, 54 and the respectively associated housing section 78, 80. This ensures that the magnetic field lines originating from the housing sections 78, 80 of the electromagnet 42 are substantially coupled into the corresponding pole shoes 52, 54 and are not short-circuited via the radial air gap 66 between the open housing ends 78, 80. The rotary lever device 72 is biased into an initial position, by means of a spring functioning as a restoring element 74, such that the poles 60, 62 of the rotary armature 58 are located in the active range of the pole shoes 52, 54 when the electromagnet 42 is energized, specifically in such a way that the air gap formed between the pole shoes 52, 54 is substantially larger than the air gap 66 between one pole 60, 62 and the associated pole shoe 52, 54 but, on the other hand, such that the distance of maximum radial overlap between the pole shoes 52, 54 and the poles 60, 62 of the rotary armature 58 has not yet been reached. This ensures that the magnetic field lines originating from the pole shoes 52, 54 can for the major part be coupled into the rotary armature 58 and are not already short-circuited, bypassing the latter.

Figure 2:
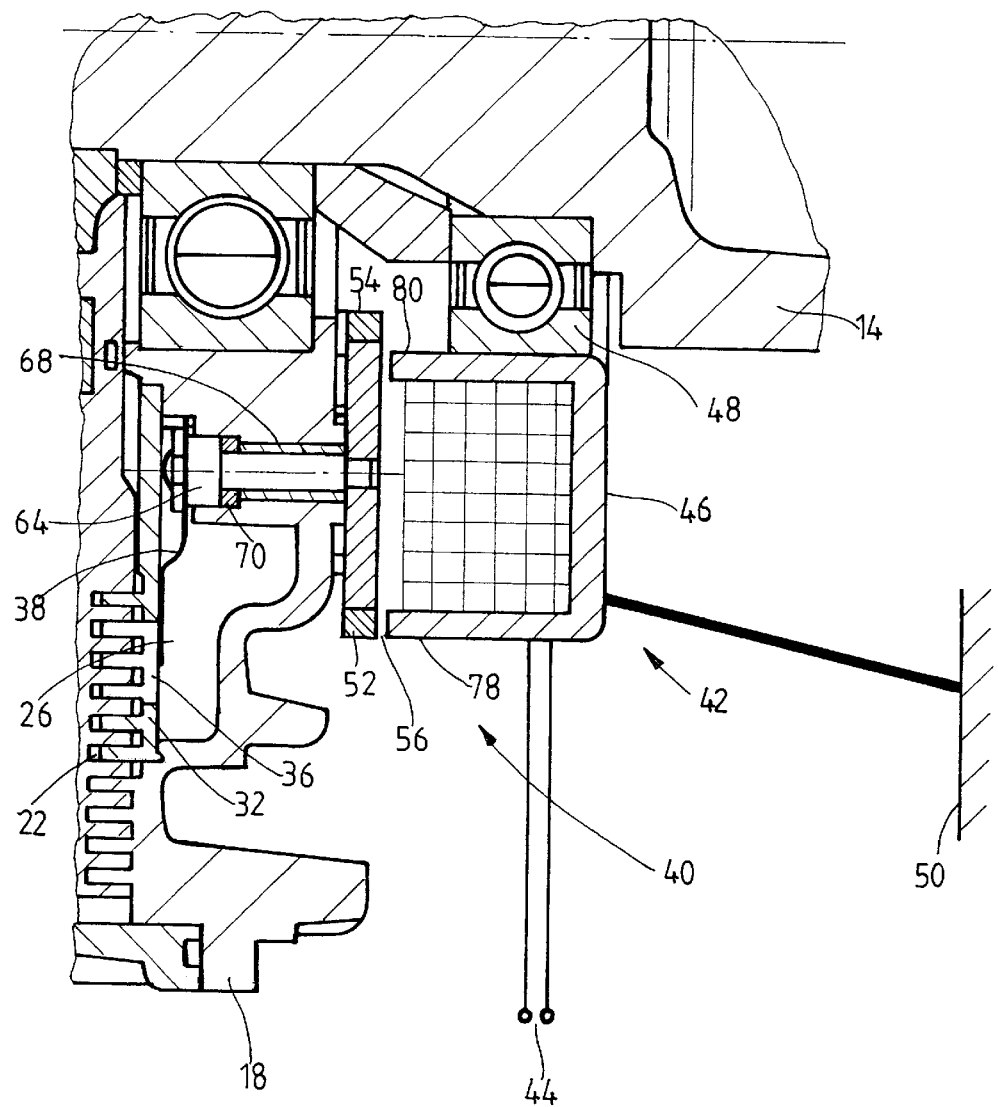
FIG. 2 shows an enlarged longitudinal sectional view of an electromagnetic actuating device.
Figure 5:
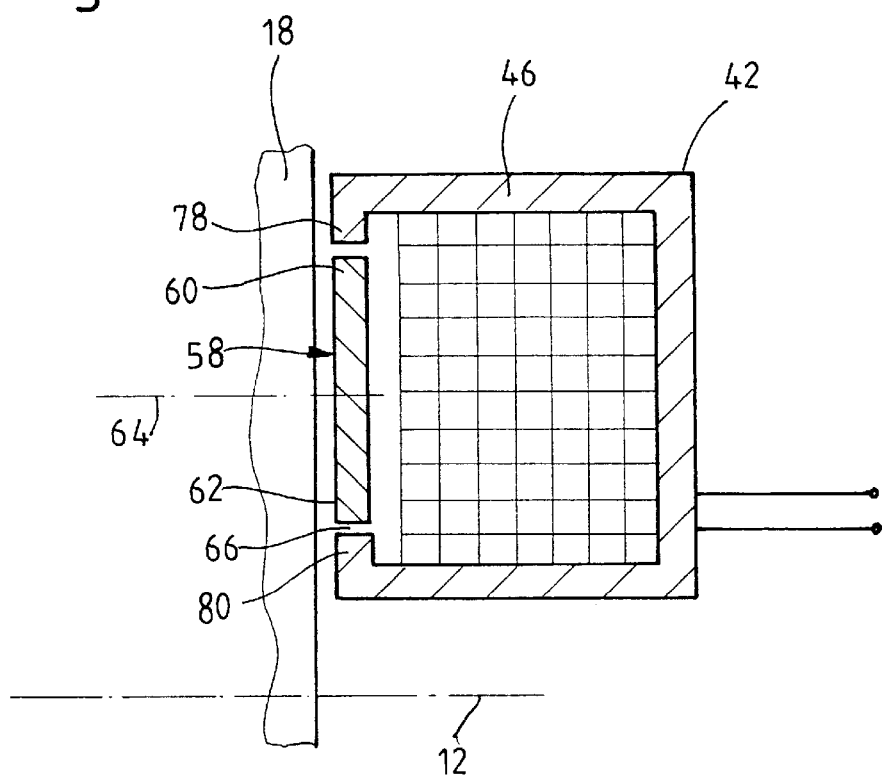
FIG. 5 shows a schematic representation of an alternative configuration of the pole shoes.

As an alternative to the embodiments illustrated in FIGS. 1–3, with pole shoes 52, 54 arranged on the coupling housing 18, the pole shoes can also be formed immediately on the electromagnet 42. For this purpose, for example the housing 46 can be connected to further elements which guide the magnetic flux. Given appropriate shaping of the housing sections 78, 80, as illustrated in FIG. 5, for example, it is even possible to dispense completely with additional elements. In this case, the sections 78, 80 of the housing 46 interact directly electromagnetically with the poles 60, 62 of the rotary armature 58 via the air gap 66.

There are also further shaping possibilities in relation to the rotary armature 58, which in FIGS. 3a, b is designed with two poles 60, 62 and is connected centrally to the shaft 64. To produce an input torque, the rotary armature 58 can also be connected at the end to the shaft 64. However, configurations having a plurality of poles, for example three or more, can also be implemented.

Supplying current to the annular coil 42 means that, on account of the electromagnetic interaction, an intrinsically closed magnetic flux path is formed, which is led from the housing 46 of the electromagnet 42, via the air gap 56, into the pole shoe 52 and from there is coupled via the air gap 66 into the rotary armature 58, in order then to enter the second pole shoe 54, incorporating the air gap 66, and ultimately entering the housing 46 again via the air gap 56. As already explained for the housing 46 of the electromagnet 42, the pole shoes 52, 54 also constitute magnetic flux guiding means, whose function is to couple the magnetic flux into the rotary armature 58. As they propagate, the magnetic field lines attempt to minimize their path length within the magnetic circuit, and therefore the magnetic resistance. As a result, the rotary armature 58 carries out a pivoting movement in the counterclockwise direction, starting from the position shown at the top in FIG. 3a, this rotation being limited either by reaching the state of the minimum magnetic resistance or by a stop. The function of the rotary armature 58 is therefore based on the active principle of the electric motor. The magnitude of the torque produced in the process depends, inter alia, on the relative position of the rotary armature 58 in relation to the associated pole shoes 52, 54 and on the magnitude of the air gaps 56, 66. If a pole shoe 52, 54 and a pole 60, 62 of the rotary armature 58 are exactly radially opposite each other, no torque is generated. As the rotational angle increases, the torque increases continuously until a maximum is reached, in order to fall again continuously as the rotational angle is increased further. The operating range is then advantageously selected with regard to the rotational angle of the rotary lever device 72 such that this range includes the angular range of the maximum torque. In this way, in order to achieve a high efficiency of the arrangement, the geometry of the pole shoes 52, 54 and the initial position of the rotary armature 58 can be coordinated. The pivoting movement of the rotary armature 58 is simultaneously passed on, via the shaft 64, to the valve plate 38 which, in FIG. 3D, has been moved upward in the counterclockwise direction from an opening position into a closing position, at the same time covering the opening 36 and blocking the flow connection between the storage chamber 26 and the operating chamber 22. By driving the electromagnetic actuating device 40, the closing or opening state of the valve arrangement 34 can therefore be switched or set.

Figure 6:
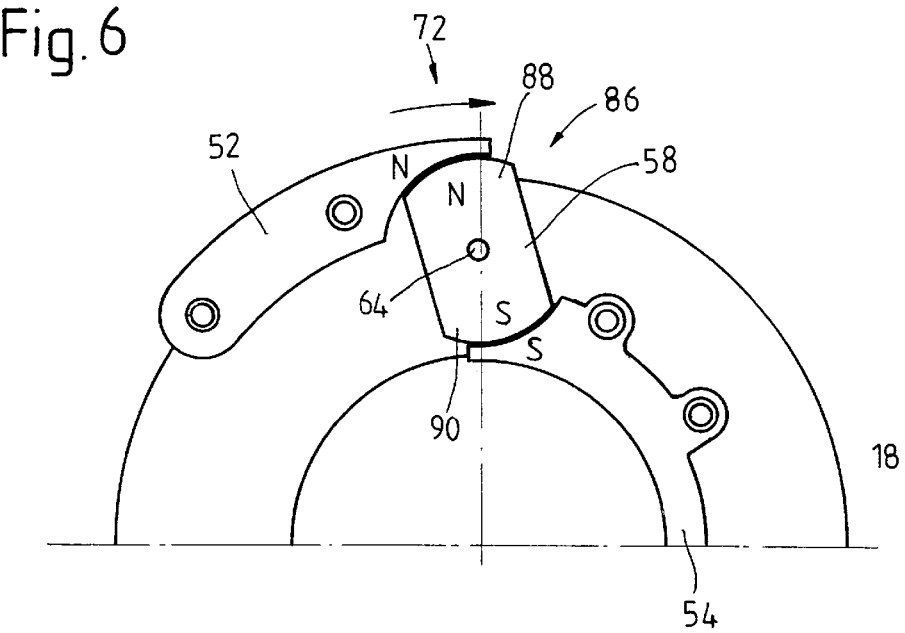
FIG. 6 shows a schematic representation of a rotary armature which comprises a permanent magnet.

According to FIG. 6, in a further alternative embodiment, a disk-like permanent magnet 86 is used as the rotary armature 58, two opposite end regions 88, 90 forming a magnetic north and south pole, respectively. In the non-energized state of the electromagnet 42, the rotary armature 58 is oriented with the pole shoes 52, 54 on account of the magnetic interaction and assumes a predetermined position, its magnetic poles 88, 90 lying radially opposite the pole shoes 52, 54 and the valve arrangement 34 being opened. If the electromagnet 42 is energized, then likewise a magnetic north and south pole are formed on the pole shoes 52, 54. In this case, the direction of the current is selected such that the pole shoes 52, 54 form poles with the same name in relation to the corresponding poles 88, 90 of the permanent magnet 86. The repulsion force resulting from this effects a pivoting movement of the rotary armature 58 in the direction of the arrow, the valve plate 38 at least partly opening the opening 36. After the electric current flow has been removed, the rotary armature 58 goes back into its initial position again, because of the magnetic attraction force, and the opening 36 is opened again. Formed on the rotary lever device 72, for example in a manner already described, is a stop which limits the pivoting range to 30°, for example. This ensures that the poles 88, 90 of the permanent magnet 86 are assigned exactly to one and the same pole shoe 52, 50 and, when the arrangement is operated, the direction of the current of the electromagnet 42 has to be defined only once. If, however, the rotary lever device 72 is designed without a stop, then two latching positions occur if the rotary armature 58 is able to rotate freely through 360°. In order to implement the active principle, in this case it is therefore necessary to define the orientation of the permanent magnet 86 and accordingly to select the direction of the current in the coil 42. In this case, a restoring element can be dispensed with. There is also the possibility of producing the rotary armature 58 from a magnetically conductive body, which comprises at least one permanent magnet. The use of costly magnetic material can thus be reduced.

As a result of arranging the rotary armature 58 on the side of the coupling housing 18 facing the electromagnet 42, a magnetic circuit which is shortened considerably as compared with previously known solutions and has a considerably higher efficiency is formed.

If, for example, the viscous coupling 10 was previously in a torque-transmitting state in which, because of the shearing action of the fluid present in the operating chamber 22, there was a torque-transmitting coupling between the coupling housing 18 and the rotor 16, then by closing the opening 36, fluid is prevented from continuing to flow into the operating chamber 22 and, secondly, because of the then increased rotational speed difference between coupling housing 18 and rotor 16, the delivery of the static pressure pump 30 is increased, with the result that the operating chamber 22 is emptied very quickly and the torque-coupling state between the rotor 16 and the coupling housing 18 is cancelled.

If this state is to be cancelled and a torque-transmitting connection is to be produced again, then the energization of the annular coil 42 is terminated, with the result that a lack of magnetic interaction means that the rotary armature 58 is no longer held in the position previously assumed and, as a result of the action of the restoring element or automatically, is moved back into the initial position, the valve plate 38 opening the opening 36 at the same time. The fluid will then enter the operating chamber 22 from the storage chamber 26 via the opening 36 and very quickly lead to the torque-coupling state being produced again.

Furthermore, in all the embodiments illustrated, the intensity of the torque-transmitting coupling between the rotor 16 and the coupling housing 18 can be set by means of pulsed energization of the coil 42, for example with a pulse-width-modulated signal characteristic. This means that a ratio between the open and closed state of the valve arrangement 34 may be set in accordance with the pulse duty factor. In the completely non-energized state, in which the free circulation of the fluid in the viscous coupling 10 is substantially not impaired, the maximum torque coupling is present. In the fully energized state, in which there is no fluid connection between storage chamber 26 and operating chamber 22, substantially complete decoupling of rotor 16 and coupling housing 18 is provided.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A viscous fluid coupling comprising:
   a coupling housing which can be fixed to a drive shaft,
   an operating chamber formed in the coupling housing,
   a rotor arranged in said operating chamber for rotation with respect to said coupling housing,
   a storage chamber in said coupling housing,
   a fluid connection between said operating chamber and said storage chamber, said fluid connection comprising an opening,
   a valve arrangement which influences said fluid connection, said valve arrangement comprising a closure element which can be moved relative to said opening, and
   an electromagnetic actuating device comprising an electromagnet, a rotary armature arranged immediately next to said electromagnet to form a magnetic flux path including the rotary armature when the electromagnet is excited and a pair of magnetic pole shoes fixed on said coupling housing, said pole shoes being arranged in an axial plane with said rotary armature, said rotary armature and said closure element being rotationally fixed on a common shaft which is rotatably mounted in said coupling housing.

2. A viscous fluid coupling as in claim 1 wherein said shaft is located radially adjacent to said storage chamber.

3. A viscous fluid coupling as in claim 1 wherein said electromagnet is substantially horseshoe-shaped and has poles which are spaced apart radially with respect to said drive shaft.

4. A viscous fluid coupling as in claim 1 wherein said electromagnet comprises an annular coil.

5. A viscous fluid coupling as in claim 1 wherein said electromagnet comprises a magnetically conductive housing.

6. A viscous fluid coupling as in claim 1 wherein said rotary armature, said shaft, and said closure element form a rotary lever element, said coupling further comprising a restoring element acting on said rotary lever element.

7. A viscous fluid coupling as in claim 1 wherein said viscous fluid coupling has a side which receives said drive shaft, said electromagnet being arranged on the side which receives said drive shaft.

8. A viscous fluid coupling comprising:
   a coupling housing which can be fixed to a drive shaft,
   an operating chamber formed in the coupling housing,
   a rotor arranged in said operating chamber for rotation with respect to said coupling housing,
   a storage chamber in said coupling housing,
   a fluid connection between said operating chamber and said storage chamber, said fluid connection comprising an opening,
   a valve arrangement which influences said fluid connection, said valve arrangement comprising a closure element which can be moved relative to said opening, and
   an electromagnetic actuating device comprising an electromagnet and a rotary armature arranged immediately next to said electromagnet to form a magnetic flux path including the rotary armature when the electromagnet is excited, said rotary armature and said closure element being rotationally fixed on a common shaft which is rotatably mounted in said coupling housing, said electromagnet comprising a magnetically conductive housing having a magnetic pole which is formed when current is applied to the electromagnet, said magnetic pole facing said coupling housing.

9. A viscous fluid coupling as in claim 8 wherein said shaft is located radially adjacent to said storage chamber.

10. A viscous fluid coupling as in claim 8 wherein said electromagnet is substantially horseshoe-shaped and has poles which are spaced apart radially with respect to said drive shaft.

11. A viscous fluid coupling as in claim 8 wherein said electromagnet comprises an annular coil.

12. A viscous fluid coupling as in claim 8 wherein said viscous fluid coupling has a side which receives said drive shaft, said electromagnet being arranged on the side which receives said drive shaft.

13. A viscous fluid coupling comprising:
   a coupling housing which can be fixed to a drive shaft,
   an operating chamber formed in the coupling housing,
   a rotor arranged in said operating chamber for rotation with respect to said coupling housing,
   a storage chamber in said coupling housing,
   a fluid connection between said operating chamber and said storage chamber, said fluid connection comprising an opening,
   a valve arrangement which influences said fluid connection, said valve arrangement comprising a closure element which can be moved relative to said opening, an electromagnetic actuating device comprising an electromagnet and a rotary armature arranged immediately next to said electromagnet to form a magnetic flux path including the rotary armature when the electromagnet is excited, said rotary armature and said closure element being rotationally fixed on a common shaft which is rotatably mounted in said coupling housing, said rotary armature, said closure element, and said shaft forming a rotary lever element,
   a restoring element acting on said rotary lever element, and
   a stop element which limits movement of said rotary lever element.

14. A viscous fluid coupling as in claim 13 wherein said shaft is located radially adjacent to said storage chamber.

15. A viscous fluid coupling as in claim 13 wherein said electromagnet is substantially horseshoe-shaped and has poles which are spaced apart radially with respect to said drive shaft.

16. A viscous fluid coupling as in claim 13 wherein said electromagnet comprises an annular coil.

17. A viscous fluid coupling as in claim 13 wherein said viscous fluid coupling has a side which receives said drive shaft, said electromagnet being arranged on the side which receives said drive shaft.

18. A viscous fluid coupling comprising:
a coupling housing which can be fixed to a drive shaft,
an operating chamber formed in the coupling housing,
a rotor arranged in said operating chamber for rotation with respect to said coupling housing,
a storage chamber in said coupling housing,
a fluid connection between said operating chamber and said storage chamber, said fluid connection comprising an opening,
a valve arrangement which influences said fluid connection, said valve arrangement comprising a closure element which can be moved relative to said opening, and
an electromagnetic actuating device comprising an electromagnet and a rotary armature arranged immediately next to said electromagnet to form a magnetic flux path including the rotary armature when the electromagnet is excited, said rotary armature and said closure element being rotationally fixed on a common shaft which is rotatably mounted in said coupling housing,
wherein said electromagnetic actuating device causes said closure element to open said opening when said electromagnet is not excited, and cause said closure element to close said opening when said electromagnet is excited.

19. A viscous fluid coupling as in claim 18 wherein said shaft is located radially adjacent to said storage chamber.

20. A viscous fluid coupling as in claim 18 wherein said electromagnet is substantially horseshoe-shaped and has poles which are spaced apart radially with respect to said drive shaft.

21. A viscous fluid coupling as in claim 18 wherein said electromagnet comprises an annular coil.

22. A viscous fluid coupling as in claim 18 wherein said viscous fluid coupling has a side which faces said drive shaft, said electromagnet being arranged on the side which faces said drive shaft.

23. A viscous fluid coupling comprising:
a coupling housing which can be fixed to a drive shaft,
an operating chamber formed in the coupling housing,
a rotor arranged in said operating chamber for rotation with respect to said coupling housing,
a storage chamber in said coupling housing,
a fluid connection between said operating chamber and said storage chamber, said fluid connection comprising an opening,
a valve arrangement which influences said fluid connection, said valve arrangement comprising a closure element which can be moved relative to said opening, and
an electromagnetic actuating device comprising an electromagnet and a rotary armature comprising a permanent magnet arranged immediately next to said electromagnet to form a magnetic flux path including the rotary armature when the electromagnet is excited, said rotary armature and said closure element being rotationally fixed on a common shaft which is rotatably mounted in said coupling housing.

24. A viscous fluid coupling as in claim 23 wherein said shaft is located radially adjacent to said storage chamber.

25. A viscous fluid coupling as in claim 23 wherein said electromagnet is substantially horseshoe-shaped and has poles which are spaced apart radially with respect to said drive shaft.

26. A viscous fluid coupling as in claim 23 wherein said electromagnet comprises an annular coil.

27. A viscous fluid coupling as in wherein said viscous fluid coupling has a side which receives said drive shaft, said electromagnet being arranged on the side which receives said drive shaft.

28. A viscous fluid coupling comprising:
a coupling housing which can be fixed to a drive shaft,
an operating chamber formed in the coupling housing,
a rotor arranged in said operating chamber for rotation with respect to said coupling housing,
a storage chamber in said coupling housing,
a fluid connection between said operating chamber and said storage chamber, said fluid connection comprising an opening,
a valve arrangement which influences said fluid connection, said valve arrangement comprising a closure element which can be moved relative to said opening, and
an electromagnetic actuating device comprising an electromagnet which surrounds said drive shaft and a rotary armature arranged immediately next to said electromagnet to form a magnetic flux path including the rotary armature when the electromagnet is excited, said rotary armature and said closure element being rotationally fixed on a common shaft which is rotatably mounted in said coupling housing.

29. A viscous fluid coupling as in claim 28 wherein said shaft is located radially adjacent to said storage chamber.

30. A viscous fluid coupling as in claim 28 wherein said electromagnet is substantially horseshoe-shaped and has poles which are spaced apart radially with respect to said drive shaft.

31. A viscous fluid coupling as in claim 28 wherein said electromagnet comprises an annular coil.

32. A viscous fluid coupling as in claim 28 wherein said viscous fluid coupling has a side which receives said drive shaft, said electromagnet being arranged on the side which receives said drive shaft.

* * * * *